(12) United States Patent
Ishikawa

(10) Patent No.: US 10,802,115 B2
(45) Date of Patent: Oct. 13, 2020

(54) LIGHT PROJECTING AND RECEIVING DEVICE, AND LASER RADAR DEVICE PROVIDED WITH SAME

(71) Applicant: KONICA MINOLTA, INC., Chiyoda-ku (JP)

(72) Inventor: Ryouta Ishikawa, Hino (JP)

(73) Assignee: Konica Minolta, Inc., Tokyo (JP)

( * ) Notice: Subject to any disclaimer, the term of this patent is extended or adjusted under 35 U.S.C. 154(b) by 296 days.

(21) Appl. No.: 15/745,943

(22) PCT Filed: Jul. 7, 2016

(86) PCT No.: PCT/JP2016/070099
§ 371 (c)(1),
(2) Date: Jan. 18, 2018

(87) PCT Pub. No.: WO2017/018152
PCT Pub. Date: Feb. 2, 2017

(65) Prior Publication Data
US 2018/0224530 A1     Aug. 9, 2018

(30) Foreign Application Priority Data
Jul. 24, 2015   (JP) ................................. 2015-146987

(51) Int. Cl.
*G01S 7/481* (2006.01)
*G01S 17/89* (2020.01)
*G01S 17/931* (2020.01)

(52) U.S. Cl.
CPC .......... *G01S 7/4817* (2013.01); *G01S 7/4816* (2013.01); *G01S 17/89* (2013.01); *G01S 17/931* (2020.01)

(58) Field of Classification Search
CPC ...... G01S 7/481; G01S 7/4817; G01S 7/4816; G01S 17/89; G01S 7/936; G01S 17/00; G01C 3/00; G01C 3/08
(Continued)

(56) References Cited

U.S. PATENT DOCUMENTS 3,954,340 A * 5/1976 Blomqvist .............. G01S 3/783
                                                     356/139.08
4,916,536 A * 4/1990 Kerr ...................... G01S 7/4811
                                                       348/139
(Continued)

FOREIGN PATENT DOCUMENTS

DE          3412076        10/1985
DE       202006005876       8/2007
(Continued)

OTHER PUBLICATIONS

Office Action dated May 7, 2019 issued in Japanese Patent Application No. 2017-531114.
(Continued)

*Primary Examiner* — Erin F Heard
*Assistant Examiner* — Michael W Justice
(74) *Attorney, Agent, or Firm* — Cozen O'Connor

(57) ABSTRACT

A light source emits light having a thin shape in a cross section viewed in the beam direction of the light. A light receiver includes a plurality of avalanche photodiodes each having a light receiving face that receives reflected light. The light receiving faces are disposed in an array at a predetermined interval along a longitudinal direction of the thin shape and the light receiver has a surface including the light receiving faces. An optical system guides the reflected light to the light receiver so that a focus point for a direction in which the light receiving faces are arrayed is set before the surface and a focus point for a perpendicular direction is
(Continued)

set on the surface, the perpendicular direction being perpendicular to both the direction in which the light receiving faces are arrayed and the beam direction of the reflected light.

2 Claims, 13 Drawing Sheets

(58) Field of Classification Search
USPC .......................................................... 348/135
See application file for complete search history.

(56) References Cited

U.S. PATENT DOCUMENTS

| | | | | |
|---|---|---|---|---|
| 5,642,164 | A | * | 6/1997 | Ogawa .................... G01B 11/00 348/335 |
| 5,933,225 | A | * | 8/1999 | Yamabuchi ............. G01S 7/481 356/5.01 |
| 2013/0188043 | A1 | * | 7/2013 | Decoster ................ G01S 17/89 348/135 |
| 2016/0025489 | A1 | | 1/2016 | Klepsvik et al. |

FOREIGN PATENT DOCUMENTS

| | | |
|---|---|---|
| EP | 1845334 | 10/2007 |
| JP | 2000-180133 | 6/2000 |
| JP | 2008-76390 | 4/2008 |
| JP | 2008-256539 | 10/2008 |
| JP | 2010-190759 | 9/2010 |
| WO | WO 2012/013536 | 2/2012 |
| WO | WO 2014/148915 | 9/2014 |

OTHER PUBLICATIONS

Preliminary Report on Patentability dated Jan. 30, 2018 which issued in the corresponding International Patent Application No. PCT/JP2016/070099.

Search Report dated Jul. 12, 2018 which issued in the corresponding European Patent Application No. 16830257.8.

* cited by examiner

LIGHT PROJECTING AND RECEIVING DEVICE, AND LASER RADAR DEVICE PROVIDED WITH SAME

RELATED APPLICATIONS

This is a U.S. National Phase Application under 35 USC 371 of International Application PCT/JP2016/070099 filed on Jul. 7, 2016.

This application claims the priority of Japanese application no. 2015-146987 filed Jul. 24, 2015, the entire content of which is hereby incorporated by reference.

TECHNICAL FIELD

The present invention relates to a light projecting and receiving device including an avalanche photodiode as a light receiver, and a laser radar device including the light projecting and receiving device.

BACKGROUND ART

A laser radar device including a scanning device detects an object with a laser beam scanned by the scanning device, and thus has a wide measurement range along a scanning direction. Such a laser radar device is currently used in various fields. For example, the laser radar device is included in a mobile object such as a car to detect an obstacle in order to prevent the mobile object from colliding with the obstacle.

Patent Literature 1 discloses such a laser radar device that employs a technique of measuring the distance to a detected object using a pulse laser beam deflected by a rotating deflector.

A laser diode that emits a laser beam having a thin shape in a cross section viewed in the beam direction is known. Using the laser diode for a laser radar device including a scanning device, a laser beam can be scanned in a scanning direction with the longitudinal direction of the thin shape of the laser beam perpendicular to the scanning direction. In this manner, the measurement region can be broadened in the longitudinal direction of the thin shape.

The measurement distance of the laser radar device can be extended by intensifying the reflected light from the measurement region, reducing the noise included in the reflected light, or raising sensitivity of the light receiver. The avalanche photodiode, which has high sensitivity and can be provided with low cost, is used as a light receiver.

A light receiver provided with an array of a plurality of avalanche photodiodes formed on a semiconductor substrate (APD array) is known. Positioning the light receiver so that the longitudinal direction of the thin shape of the laser beam aligns with the direction in which the avalanche photodiodes are arrayed (the direction in which a plurality of light receiving faces are arrayed) provides a wide view angle and improves resolution.

The light receiver receives a light flux of a reflected light incident on the light receiving face. The light receiver however cannot receive the light flux of the reflected light that is incident on a region between adjacent light receiving faces but not on the light receiving face. In such a case, the image created by the light flux cannot be detected (causing loss of information). Providing a smaller gap between the adjacent light receiving faces can prevent loss of information however, it is inherently difficult for the avalanche photodiodes used in the APD array to provide a small gap between the adjacent light receiving faces. For example, a gap of about 0.1 mm is often required.

CITATION LIST

Patent Literature

Patent Literature 1: JP 2010-190759 A (paragraphs 0031 and 0055 to 0058)

SUMMARY OF INVENTION

An object of the present invention is to provide a light projecting and receiving device in which, in a light receiver including a plurality of avalanche photodiodes disposed in an array with a predetermined gap between the light receiving faces of the adjacent photodiodes, the performance of receiving reflected light can be improved without reducing a gap between the adjacent light receiving faces. Another object is to provide a laser radar device including the light projecting and receiving device.

A light projecting and receiving device according to an aspect of the present invention that achieves the object includes a light source configured to emit light having a thin shape in a cross section viewed in a beam direction of the light, a light receiver including a plurality of avalanche photodiodes each having a light receiving face that receives reflected light reflected from a measurement region by irradiating the measurement region with the light emitted from the light source, the light receiving faces being disposed in an array at a predetermined interval along a longitudinal direction of the thin shape, the light receiver having a surface including the light receiving faces and a region between the adjacent light receiving faces, and an optical system configured to guide the reflected light to the light receiver so that a focus point for a direction in which the light receiving faces are arrayed is set before or behind the surface and a focus point for a perpendicular direction is set on the surface, the perpendicular direction being perpendicular to both the direction in which the light receiving faces are arrayed and the beam direction of the reflected light.

The aforementioned object and other objects, characteristics, and benefits of the present invention will be understood by the details described below and the appended drawings.

DESCRIPTION OF EMBODIMENTS

Figure 1:
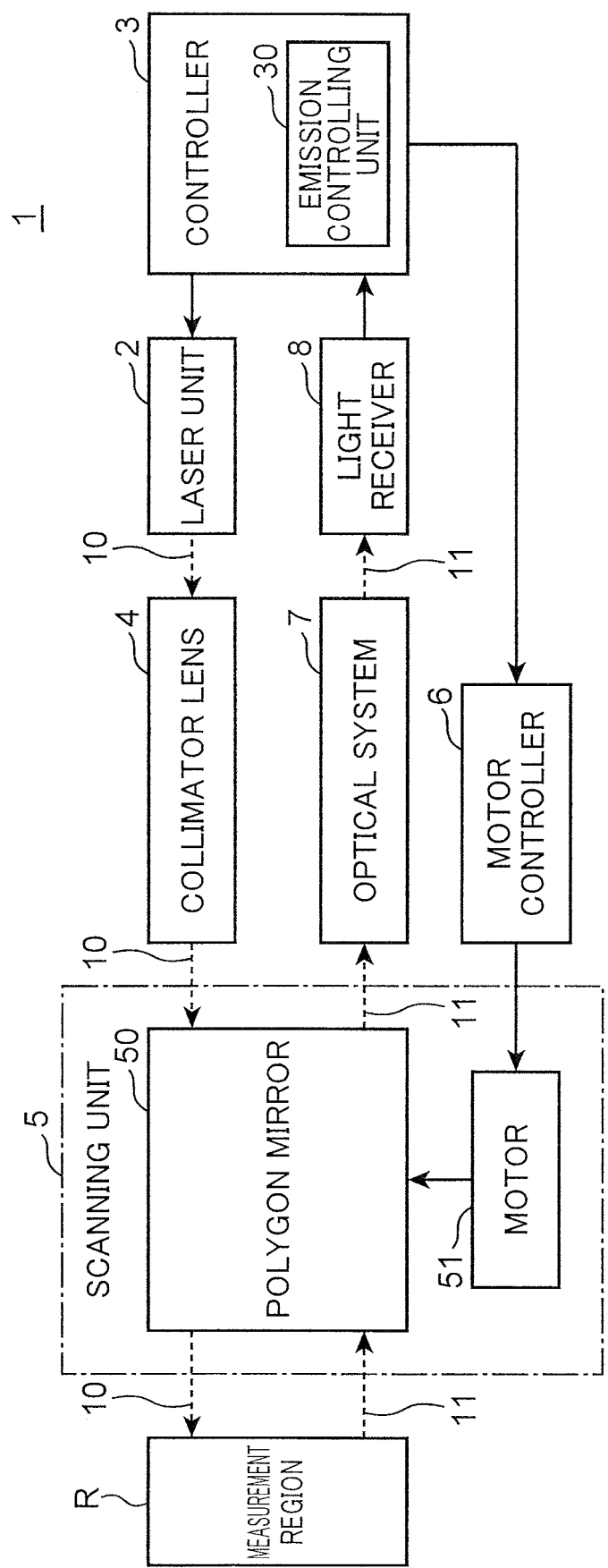
FIG. 1 is a block diagram illustrating a configuration of a laser radar device according to an embodiment.

An embodiment of the present invention will now be described below in detail with reference to the drawings. In the drawings, the component appended with the same reference sign indicates the same component. Description on the component that is already explained will be omitted.

FIG. 1 is a block diagram illustrating a configuration of a laser radar device 1 according to an embodiment. The laser radar device 1 includes a laser unit 2, a controller 3, a collimator lens 4, a scanning unit 5, a motor controller 6, an optical system 7, and a light receiver 8.

Figure 2:
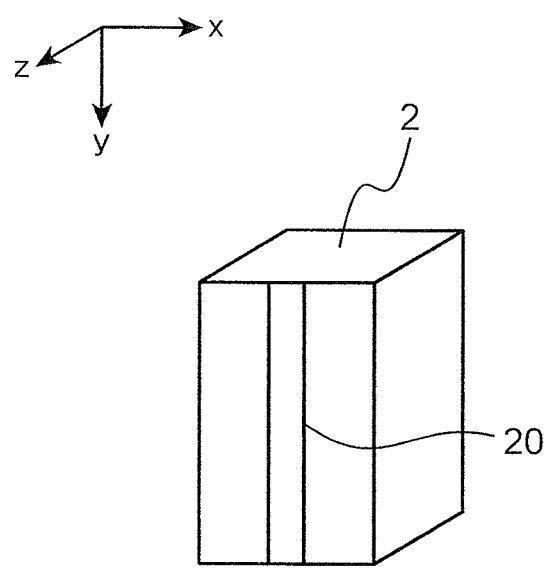
FIG. 2 is a schematic view illustrating a laser unit emitting a laser beam.

The laser unit 2 will now be described. FIG. 2 is a schematic view illustrating a laser unit 2 emitting a laser beam 10. In the three dimensional space defined by an x-direction, a y-direction, and a z-direction, the z-direction is defined as the beam direction of the laser beam 10.

The laser unit 2 is an example light source which is a semiconductor laser including a light emitter 20 that emits a pulse laser beam 10. The front face of the light emitter 20 (namely, the light emitting face) has a thin rectangular shape having a short side along the x-direction and the long side along the y-direction. Thus, when viewed in the beam direction, the laser beam 10 has a thin shape extending along the y-direction. A plurality of single mode semiconductor lasers or a plurality of fiber lasers may be used to form a laser beam 10 having a thin rectangular shape with the short side along the x-direction and the long side along the y-direction.

Referring to FIG. 1, the controller 3 controls the total operation of the laser radar device 1 and includes a central processing unit (CPU), a random access memory (RAM), a read only memory (ROM), and a laser diode (LD) driver. The LD driver is a driver circuit that drives the laser unit 2. The controller 3 includes an emission controlling unit 30 as a functional block.

The emission controlling unit 30 controls the laser unit 2 to emit the laser beam 10 on a cyclical basis (for example, every 16.7 μs). Emission of the laser beam 10 needs not be made on a cyclical basis but may be made intermittently.

The collimator lens 4 collimates the laser beam 10 emitted by the laser unit 2 on a cyclical basis into a parallel light. The laser beam 10 collimated by the collimator lens 4 is directed to the scanning unit 5.

The scanning unit 5 is an optical device that scans in the scanning direction the laser beam 10 having a thin shape extending in the y-direction as illustrated in FIG. 2. The scanning direction is in the x-direction. In the embodiment, the scanning unit 5 having an example configuration including a polygon mirror 50 and a motor 51 that rotates the polygon mirror 50 will be described. The scanning unit 5 is not limited to such a configuration but may include a galvano-mirror or a MEMS mirror.

Instructed by the controller 3, the motor controller 6 controls the motor 51 to control the rotation of the polygon mirror 50.

The laser beam 10 scanned by the polygon mirror 50 having a thin shape in a cross section in the beam direction of the laser beam 10 is emitted to a measurement region R. The measurement region R can be broadened in the scanning direction (x-direction) by scanning the laser beam 10 emitted to the measurement region R. The reflected light 11 resulting from emitting the laser beam 10 to the measurement region R is made incident on the polygon mirror 50 and at the same time reflected by the polygon mirror 50 and then is received by the optical system 7. The optical system 7 guides the received reflected light 11 to the light receiver 8.

Figure 3:
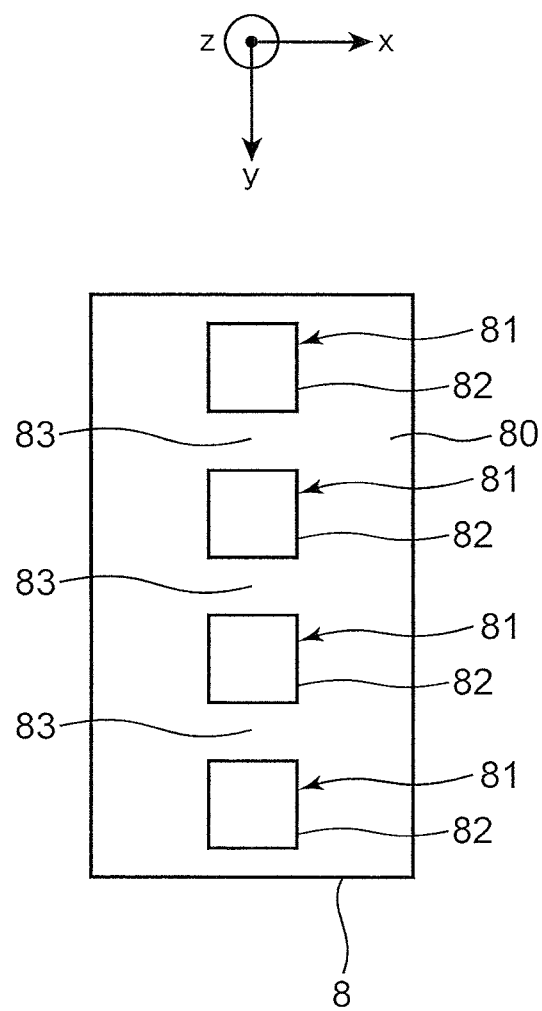
FIG. 3 is a plan view of a light receiver.

FIG. 3 is a plan view of the light receiver 8. The light receiver 8 includes a semiconductor substrate, and four avalanche photodiodes 81 formed on the semiconductor substrate. In the exemplarily described embodiment, four avalanche photodiodes 81 are provided. However, the avalanche photodiodes 81 may be provided by any number larger than one.

Each of the four avalanche photodiodes 81 has a light receiving face 82 that receives the reflected light 11. The four avalanche photodiodes 81 are formed to be disposed in an array at a predetermined interval on the semiconductor substrate. Thus, the four light receiving faces 82 are disposed in an array at a predetermined interval. The interval may be or may not be constant (for example, intervals may be random). The surface 80 of the light receiver 8 includes four light receiving faces 82 and regions 83 between adjacent light receiving faces 82. The light receiver 8 is disposed so that the light receiving faces 82 are arrayed along the y-direction (the direction in which the thin shape of the reflected light 11 extends).

Figure 4:
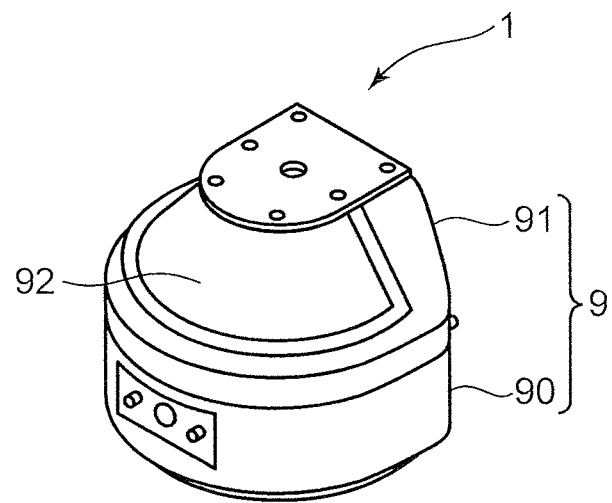
FIG. 4 is a perspective view illustrating an external appearance of a laser radar device according to the embodiment.

FIG. 4 is a perspective view illustrating an external appearance of a laser radar device 1 according to the embodiment. The laser radar device 1 includes a housing 9 that houses the laser unit 2, the controller 3, the collimator lens 4, the scanning unit 5, the motor controller 6, the optical system 7, and the light receiver 8 illustrated in FIG. 1. The housing 9 includes a lower member 90 that has a shape of a bottomed semicircular sleeve and an upper member 91 having a shape of a bottomed semicircular truncated cone joined to the upper portion of the lower member 90. The conically curved side face of the upper member 91 is opened to form an aperture 92.

Figure 5:
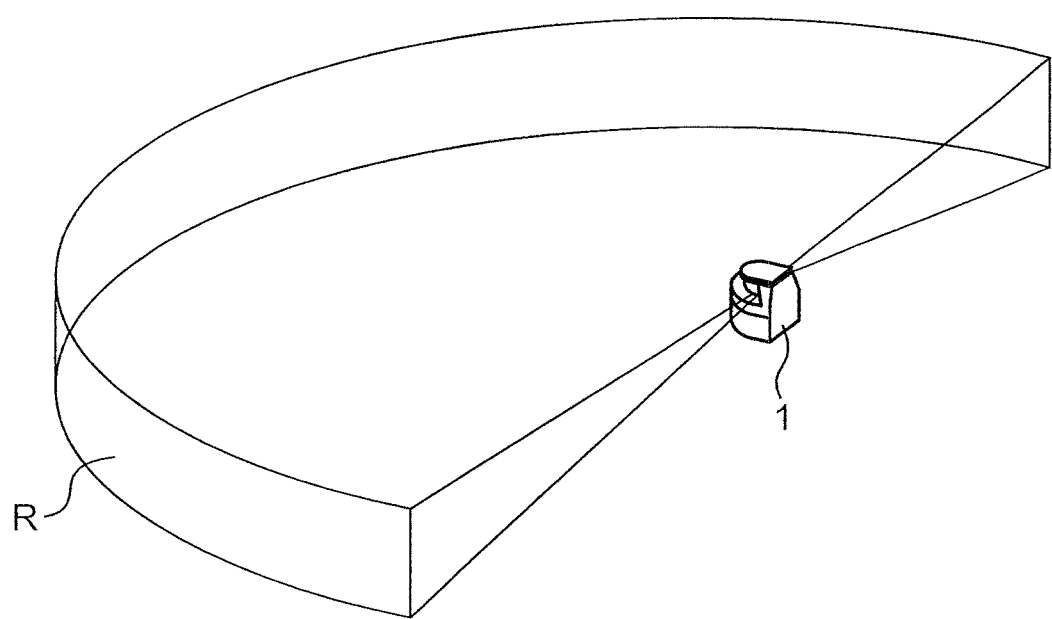
FIG. 5 is an explanatory view explaining a measurement region irradiated with a laser beam emitted by a laser radar device.

The laser beam 10 scanned by the polygon mirror 50 is emitted through the aperture 92 toward the measurement region R. FIG. 5 is an explanatory view explaining the measurement region R irradiated with the laser beam 10 emitted by the laser radar device 1. The reflected light 11 reflected by the measurement region R passes through the aperture 92 and is received by the light receiver 8 via the polygon mirror 50 and the optical system 7.

With reference to FIG. 3, the optical system 7 guides the reflected light 11 to the light receiver 8 with the focus point for the direction in which the light receiving faces 82 are arrayed set nearer or farther than the surface 80 of the light receiver 8 and the focus point for perpendicular direction set on the surface 80, where the perpendicular direction (x-direction) is perpendicular to both the direction in which the light receiving faces 82 are arrayed (y-direction) and the beam direction of the reflected light 11 (z-direction). This will be described by comparing a first comparative example and a second comparative example.

Figure 6:
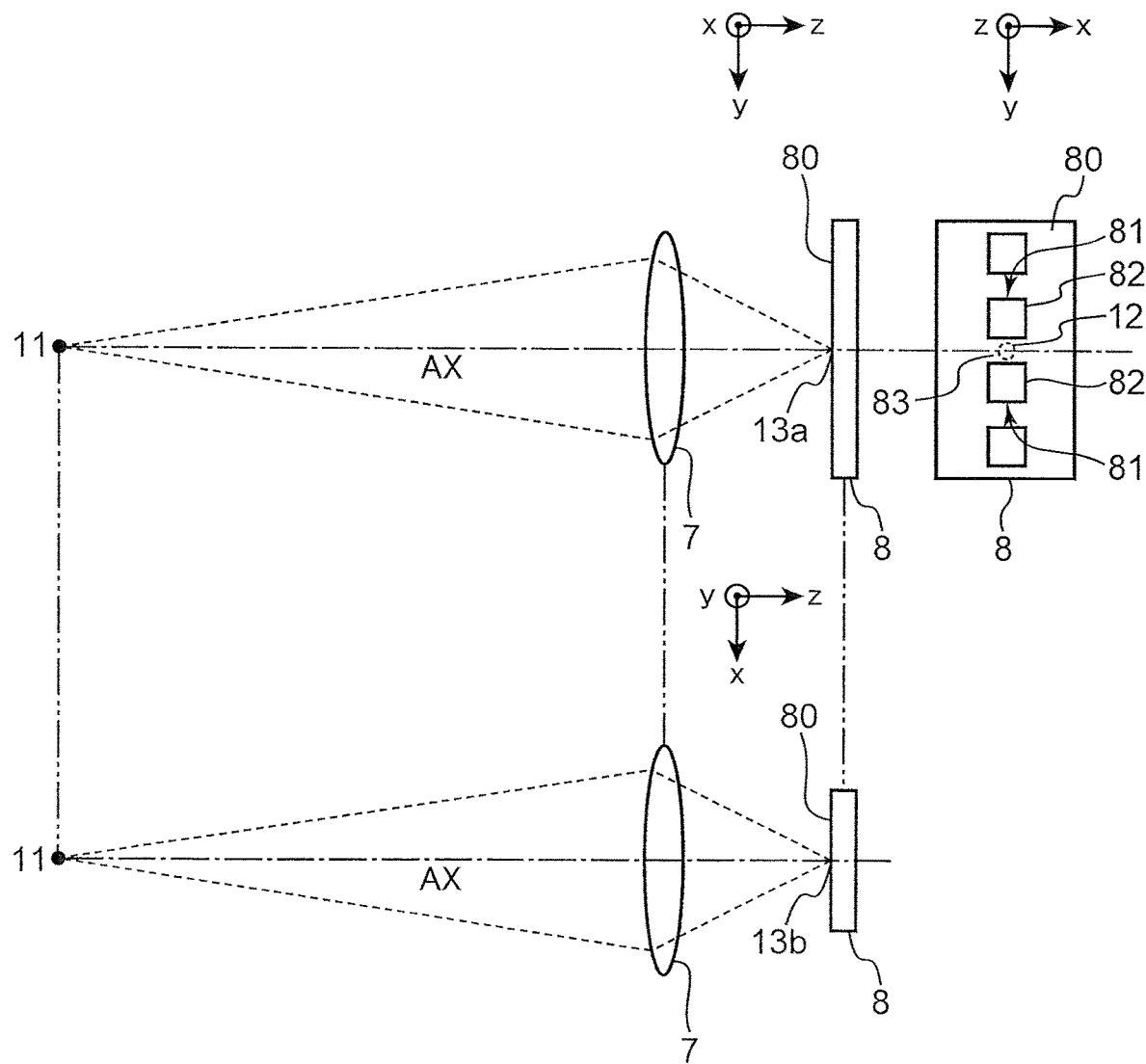
FIG. 6 is a ray diagram illustrating a reflected light passing through an optical system to be guided to the light receiver in a first comparative example.

FIG. 6 is a ray diagram illustrating the reflected light 11 passing through the optical system 7 to be guided to the light receiver 8 in the first comparative example. The reflected light 11 is the laser beam 10 reflected by the measurement region R illustrated in FIG. 1. The reflected light 11 incident on the polygon mirror 50 illustrated in FIG. 1 is reflected by the polygon mirror 50 to be directed to the optical system 7. AX represents an optical axis. The same is true for FIGS. 7 to 12.

The optical system 7 of the first comparative example is a light receiving lens. The light receiving lens sets a focus point 13a for the y-direction and a focus point 13b for the x-direction on the surface 80 of the light receiver 8. Since the diameter of the light flux 12 is small on the surface 80, the light receiving face 82 cannot receive the light flux 12 incident on the region 83 between the adjacent light receiving faces 82.

Figure 7:
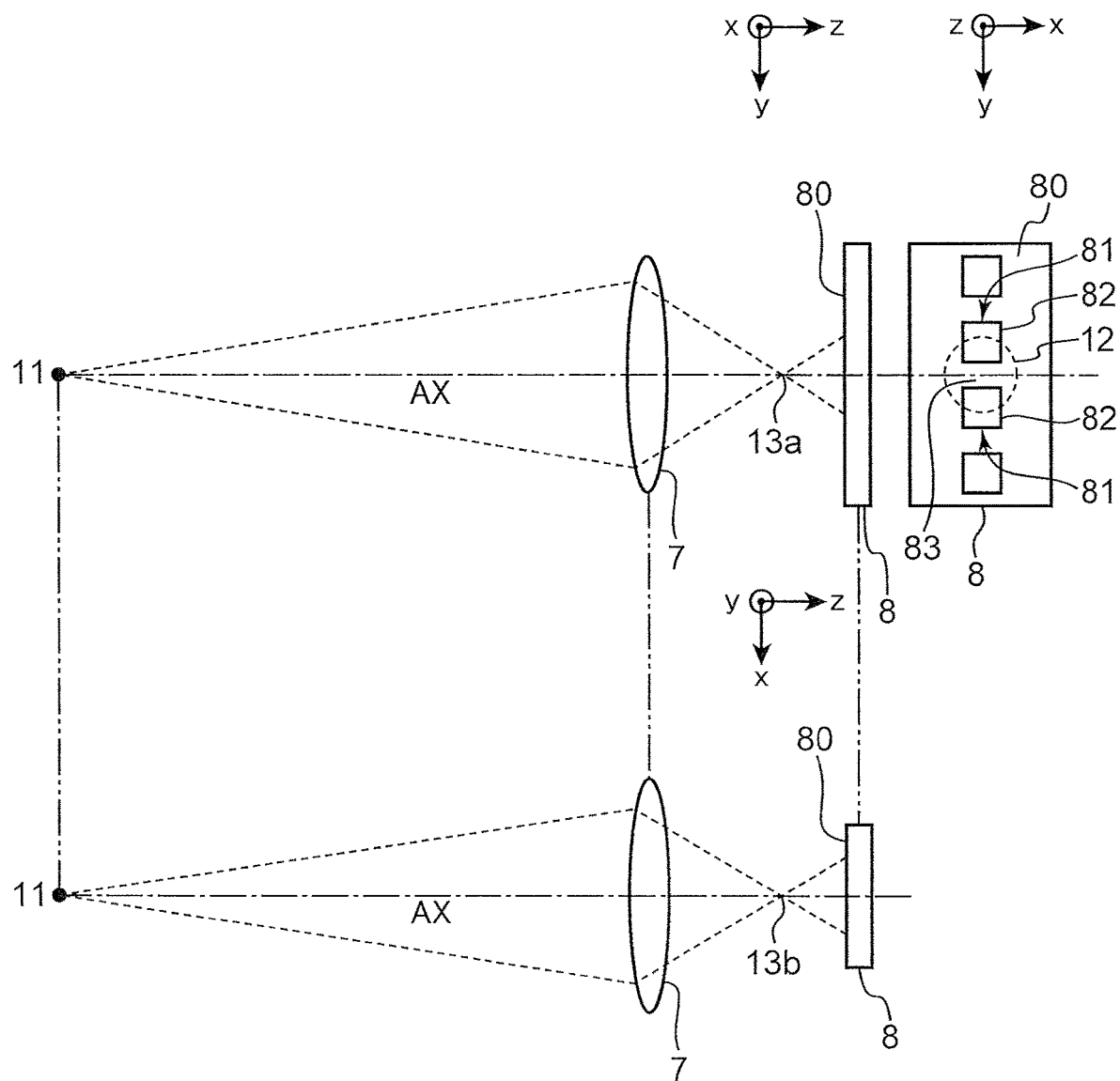
FIG. 7 is a ray diagram illustrating a reflected light passing through an optical system to be guided to the light receiver in a second comparative example.

FIG. 7 is a ray diagram illustrating the reflected light 11 passing through the optical system 7 to be guided to the light receiver 8 in the second comparative example. The optical system 7 of the second comparative example is a light receiving lens. The light receiving lens sets the focus point 13a for the y-direction and the focus point 13b for the x-direction nearer than the surface 80 of the light receiver 8. Since the diameter of the light flux 12 is large on the surface 80, the light flux 12 incident on the region 83 between the adjacent light receiving faces 82 can reach the light receiving face 82.

As described above, when viewed in the beam direction of the reflected light 11, the diameter of the light flux 12 of the reflected light 11 incident on the surface 80 is large when the focus points 13a and 13b are moved nearer (or farther) than the surface 80 of the light receiver 8, namely, when defocused. Thus, the light flux 12 of the reflected light 11 incident on the region 83 between the adjacent light receiving faces 82 can reach the light receiving face 82, so that the light flux 12 can be detected by the light receiving face 82.

When simply defocused however, the x-direction diameter of the light flux 12 of the reflected light 11 also becomes large. Since the light receiving faces 82 are not arrayed in the x-direction, the light receiving face 82 receives a portion of the reflected light 11. The amount of light received by the light receiving face 82 therefore decreases, resulting in decrease in SN ratio.

Figure 8:
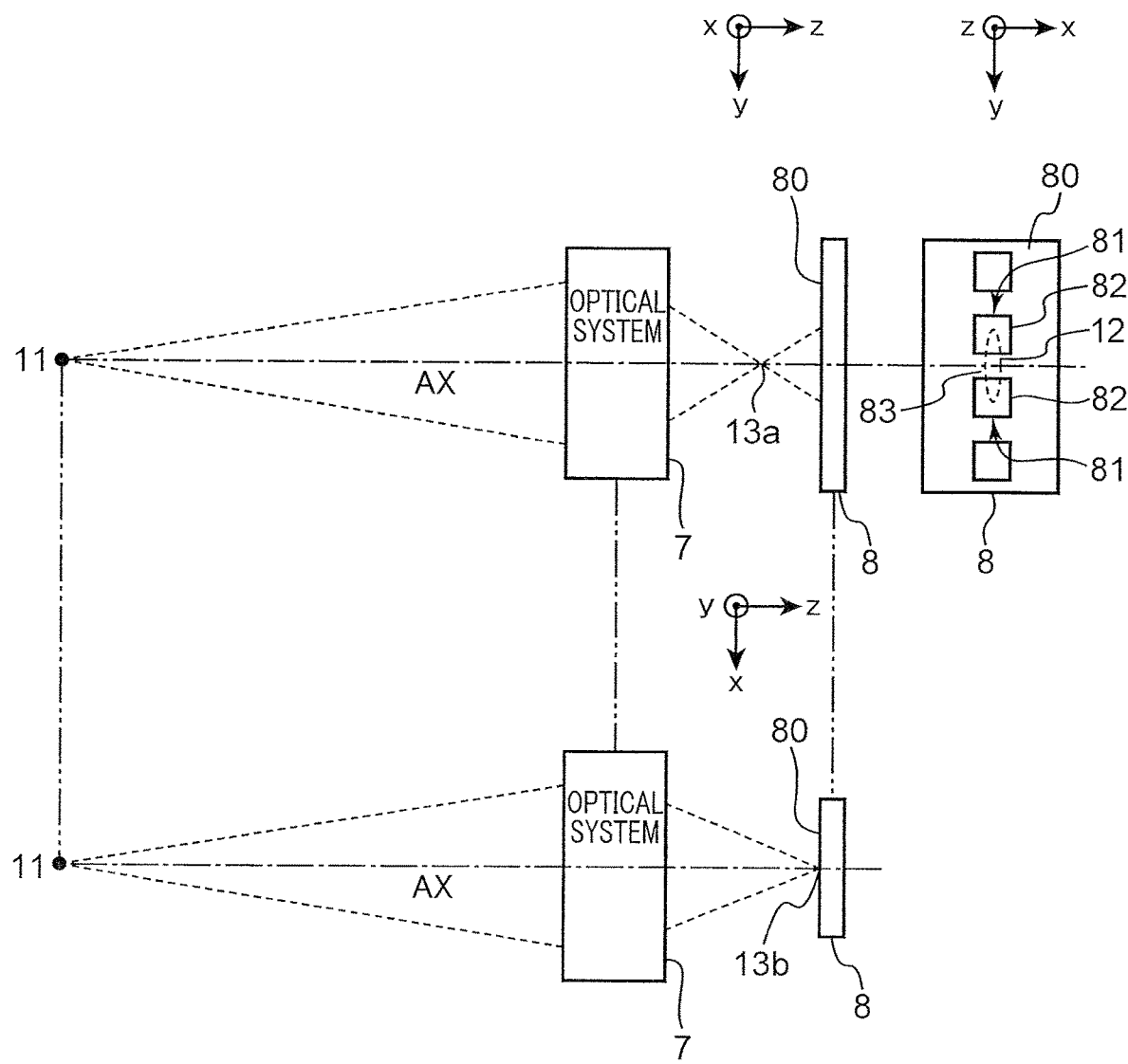
FIG. 8 is a ray diagram illustrating a reflected light passing through an optical system to be guided to the light receiver in the embodiment.

FIG. 8 is a ray diagram illustrating the reflected light 11 passing through the optical system 7 to be guided to the light receiver 8 in the embodiment. The optical system 7 guides the reflected light 11 to the light receiver 8 with the focus point 13a for the y-direction (direction in which the light receiving faces 82 are arrayed) set before (or behind) than the surface 80 of the light receiver 8 and the focus point 13b for the x-direction (perpendicular direction) set on the surface 80 of the light receiver 8. Accordingly, the light flux 12 of the reflected light 11 incident on the surface 80 of the light receiver 8 has a larger size in the y-direction than in the x-direction (in other words, the light flux 12 of the reflected light 11 has an elliptical shape that has the long axis in the y-direction and the short axis in the x-direction).

Using the optical system 7 included in the embodiment in which the focus point 13a for the y-direction is set before (or behind) than the surface 80 of the light receiver 8, the size in the y-direction of the light flux 12 of the reflected light 11 incident on the surface 80 of the light receiver 8 can be increased. In contrast, since the focus point 13b for the x-direction is set on the surface 80 of the light receiver 8, the increase in the size in the x-direction of the light flux 12 of the reflected light 11 incident on the surface 80 of the light receiver 8 can be avoided.

As described above, the optical system 7 included in the embodiment increases the size in the y-direction of the light flux 12 of the reflected light 11 incident on the surface 80 of the light receiver 8, which enables the light flux 12 incident on the region 83 between the adjacent light receiving faces 82 to reach the light receiving face 82.

If the light flux 12 of the reflected light 11 on the surface 80 of the light receiver 8 is large in the x-direction, the light flux 12 exists beyond the light receiving face 82 in the x-direction. If a large light receiving face 82 is provided, the light flux 12 is received by the light receiving face 82 without existing beyond the light receiving face 82. However, a large light receiving face 82 has a wide light receiving area and thus causes greater noise, which results in reduction in S/N ratio. Therefore, the increase in the size in the x-direction of the light flux 12 of the reflected light 11 on the surface 80 of the light receiver 8 should be avoided.

According to the embodiment as described above, in the light receiver 8 including a plurality of avalanche photodiodes 81 with the light receiving faces 82 of the avalanche photodiodes 81 disposed in an array at a predetermined interval, the performance of receiving the reflected light 11 can be improved without reducing the gap between the adjacent light receiving faces 82.

Figure 9:
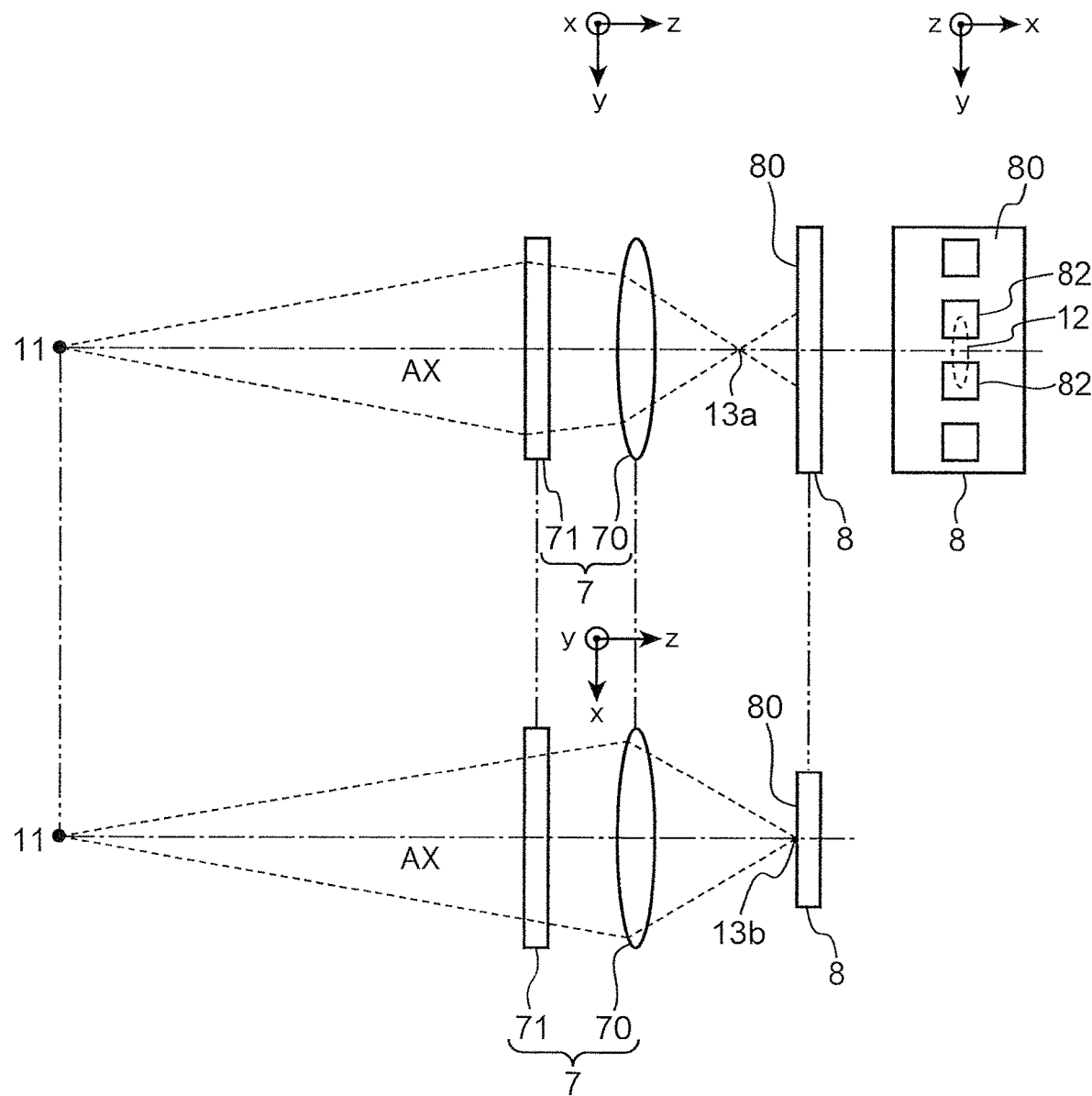
FIG. 9 is a ray diagram illustrating a reflected light passing through an optical system to be guided to the light receiver in a first aspect of the optical system included in the embodiment.

A first to four aspects described below are provided as the optical system 7 included in the embodiment. FIG. 9 is a ray diagram illustrating the reflected light 11 passing through the optical system 7 to be guided to the light receiver 8 in the first aspect of the optical system 7 included in the embodiment. The optical system 7 includes a light receiving lens 70 and an optical element 71.

The light receiving lens 70 is a circular lens that receives the reflected light 11 and focuses the light on the light receiver 8. The light receiving lens 70, which sets the focus point 13a for the y-direction and the focus point 13b for the x-direction on the surface 80 of the light receiver 8, receives the reflected light 11 and guides the received light 11 to the light receiver 8.

The optical element 71 is disposed before the light receiving lens 70 in the z-direction (the beam direction of the reflected light 11), allows the reflected light 11 to pass through, and has positive power (also referred to as optical power) only in the y-direction. The power is the inverse of the focus distance.

The optical element 71 is, for example, a cylinder lens or a diffraction grating. The optical element 71 may be disposed behind the light receiving lens 70. The above description can be said for the second aspect, the third aspect, and the fourth aspect.

The optical element 71 included in the first aspect of the optical system 7 allows the reflected light 11 to pass through and has positive power only in the y-direction. Thus, the focus point 13a for the y-direction of the optical system 7 can be shifted from the surface 80 of the light receiver 8 to a point before the surface 80 with the focus point 13b for the x-direction of the optical system 7 on the surface 80 of the light receiver 8 (in other words, defocusing is made only in the y-direction and not in the x-direction).

Figure 10:
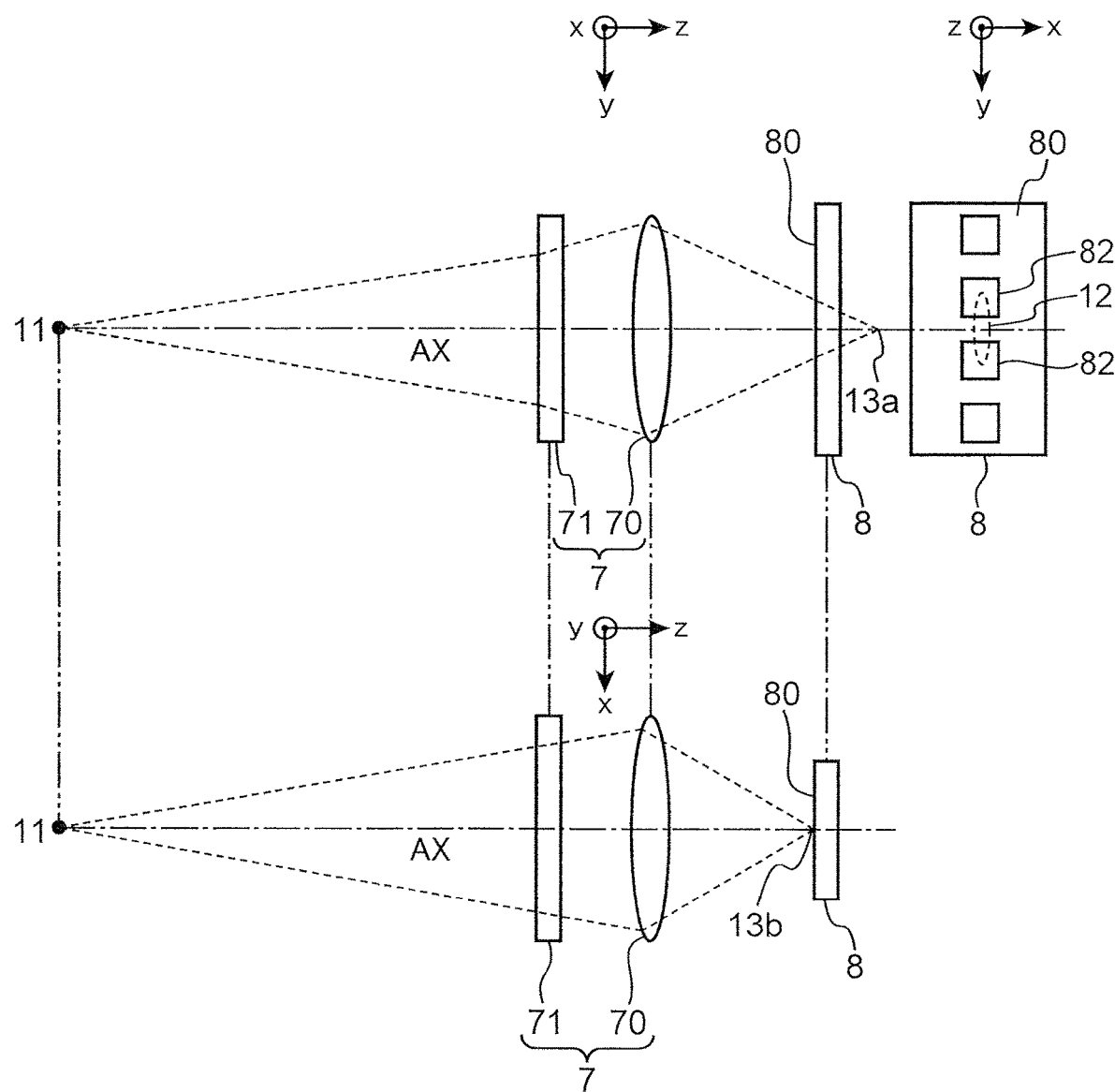
FIG. 10 is a ray diagram illustrating a reflected light passing through an optical system to be guided to the light receiver in a second aspect of the optical system included in the embodiment.

FIG. 10 is a ray diagram illustrating the reflected light 11 passing through the optical system 7 to be guided to the light receiver 8 in the second aspect of the optical system 7 included in the embodiment. The optical system 7 includes a light receiving lens 70 and an optical element 71. The second aspect is different from the first aspect as described below. The first aspect uses the optical element 71 that allows the reflected light 11 to pass through and has positive power only in the y-direction. In contrast, the second aspect uses the optical element 71 that allows the reflected light 11 to pass through and has negative power only in the y-direction.

The optical element 71 included in the second aspect of the optical system 7 allows the reflected light 11 to pass through and has negative power only in the y-direction. Thus, the focus point 13a for the y-direction of the optical system 7 can be shifted from the surface 80 of the light receiver 8 to a point behind the surface 80 with the focus point 13b for the x-direction of the optical system 7 on the surface 80 of the light receiver 8 (in other words, defocusing is made only in the y-direction and not in the x-direction).

Figure 11:
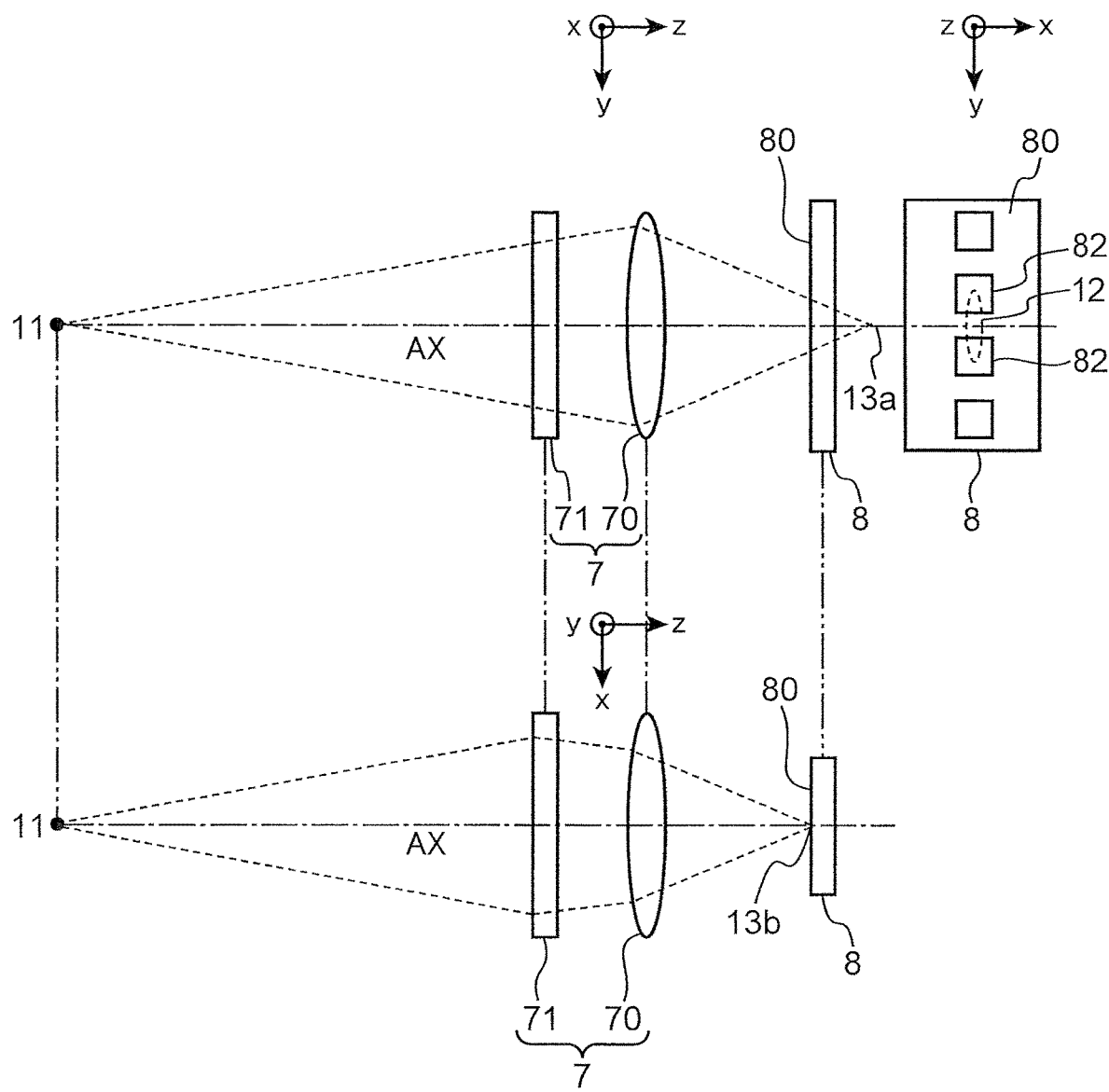
FIG. 11 is a ray diagram illustrating a reflected light passing through an optical system to be guided to the light receiver in a third aspect of the optical system included in the embodiment.

FIG. 11 is a ray diagram illustrating the reflected light 11 passing through the optical system 7 to be guided to the light receiver 8 in the third aspect of the optical system 7 included in the embodiment. The optical system 7 includes a light receiving lens 70 and an optical element 71.

The light receiving lens 70 is a circular lens that receives the reflected light 11 and focuses the light on the light receiver 8. The light receiving lens 70, which sets the focus point 13a for the y-direction and the focus point 13b for the x-direction behind the surface 80 of the light receiver 8, receives the reflected light 11 and guides the reflected light 11 to the light receiver 8.

The optical element 71 is disposed before the light receiving lens 70 in the z-direction (the beam direction of the reflected light 11), allows the reflected light 11 to pass through, and has positive power only in the x-direction.

The optical element 71 included in the third aspect of the optical system 7 allows the reflected light 11 to pass through and has positive power only in the x-direction. Thus, the focus point 13b for the x-direction of the optical system 7 can be shifted from the point behind the surface 80 of the light receiver 8 to the surface 80 with the focus point 13a for the y-direction of the optical system 7 set on the point behind the surface 80 of the light receiver 8 (in other words, defocusing is made only in the y-direction and not in the x-direction).

Figure 12:
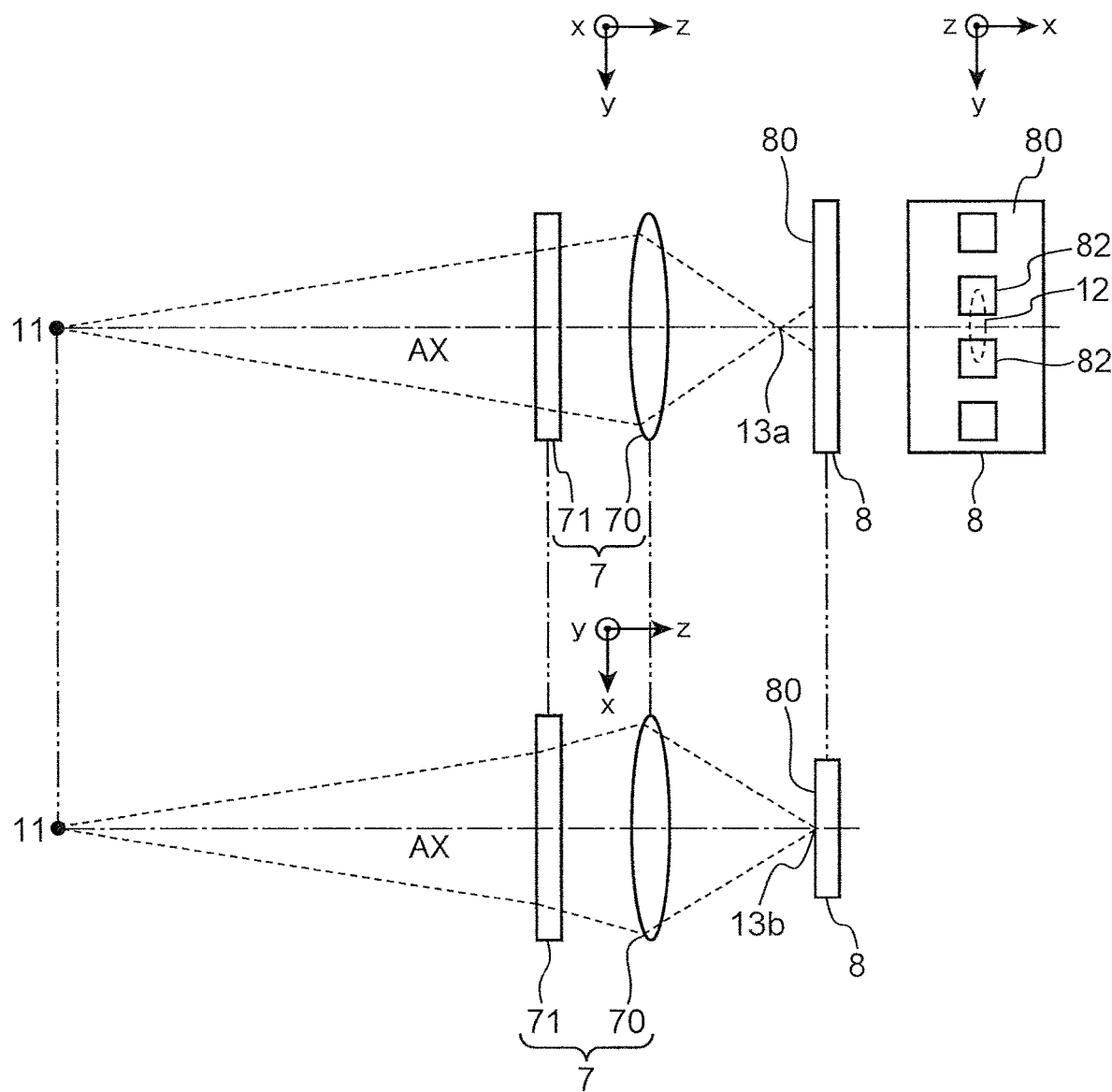
FIG. 12 is a ray diagram illustrating a reflected light passing through an optical system to be guided to the light receiver in a fourth aspect of the optical system included in the embodiment.

FIG. 12 is a ray diagram illustrating the reflected light 11 passing through the optical system 7 to be guided to the light receiver 8 in the fourth aspect of the optical system 7 included in the embodiment. The optical system 7 includes a light receiving lens 70 and an optical element 71. The fourth aspect is different from the third aspect as described below. The fourth aspect uses the light receiving lens 70 that sets the focus point 13a for the y-direction and the focus point 13b for the x-direction before the surface 80 of the light receiver 8. The fourth aspect uses the optical element 71 that allows the reflected light 11 to pass through and has negative power only in the x-direction.

The optical element 71 included in the fourth aspect of the optical system 7 allows the reflected light 11 to pass through and has negative power only in the x-direction. Thus, the focus point 13b for the x-direction of the optical system 7 can be shifted from the point before the surface 80 of the light receiver 8 to the surface 80 with the focus point 13a for the y-direction of the optical system 7 set on the point before the surface 80 of the light receiver 8 (in other words, defocusing is made only in the y-direction and not in the x-direction).

Figure 13:
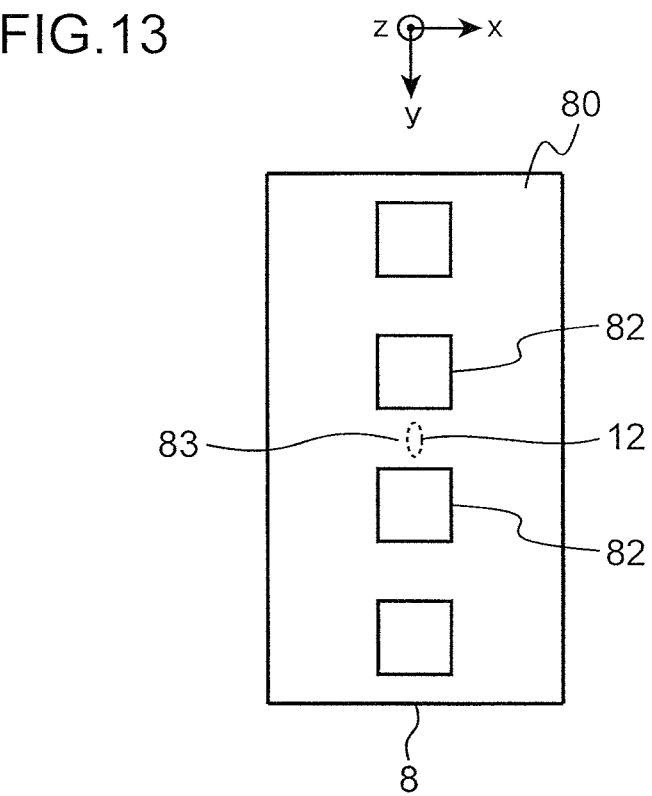
FIG. 13 is a schematic view illustrating a light flux incident on a region between adjacent light receiving faces with a focus point of an anamorphic lens on a surface of the light receiver.

The exemplary modification of the embodiment will now be described. The exemplary modification uses an anamorphic lens as the optical system 7. The anamorphic lens compresses the light flux 12 only in one direction. FIG. 13 is a schematic view illustrating the light flux 12 incident on the region 83 between the adjacent light receiving faces 82 with the focus point (the focus point for the x-direction and the focus point for the y-direction) of the anamorphic lens set on the surface 80 of the light receiver 8. In this manner, the light flux 12 of the reflected light 11 has an oval shape having the long diameter in the y-direction and the short diameter in the x-direction.

Figure 14:
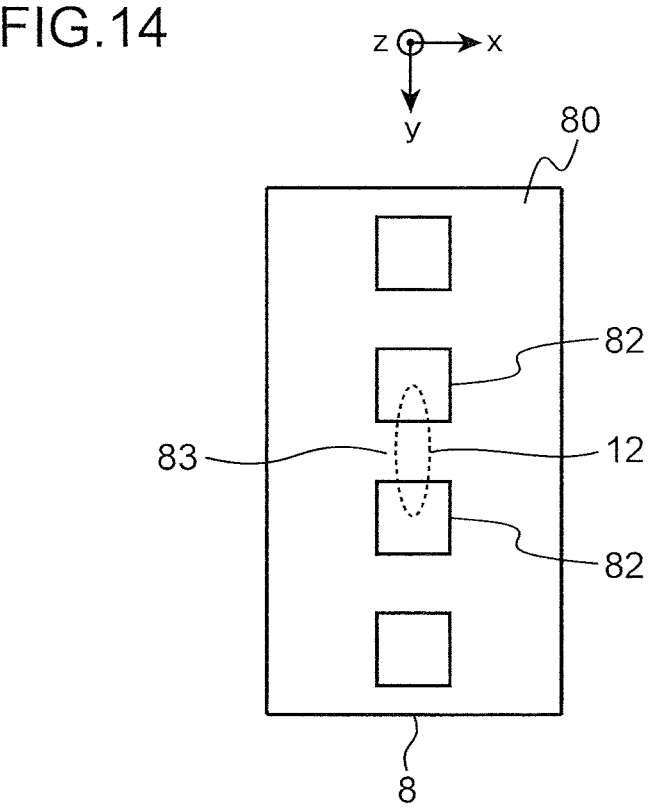
FIG. 14 is a schematic view illustrating a light flux incident on a region between adjacent light receiving faces in an optical system included in an exemplary modification of the embodiment.

FIG. 14 is a schematic view illustrating a light flux 12 incident on the region 83 between the adjacent light receiving faces 82 in the optical system 7 included in the exemplary modification of the embodiment. The anamorphic lens sets the focus point for the y-direction (direction in which the light receiving faces 82 are arrayed) before or behind the surface 80 of the light receiver 8 and the focus point for the x-direction (perpendicular direction) on the surface 80, thereby creating defocus on the surface 80 of the light receiver 8. Thus, the elliptical light flux 12 illustrated in FIG. 13 is enlarged to be the elliptical light flux 12 illustrated in FIG. 14.

In this manner, the size in the y-direction of the light flux 12 of the reflected light 11 can be increased on the surface 80 of the light receiver 8. In contrast, the increase in the size in the x-direction of the light flux 12 of the reflected light 11 can be avoided on the surface 80 of the light receiver 8.

According to the same reason as the embodiment, the exemplary modification is such that, in the light receiver 8 including a plurality of avalanche photodiodes 81 with the light receiving faces 82 of the avalanche photodiodes 81 disposed in an array at a predetermined interval, the performance of receiving the reflected light 11 can be improved without reducing the gap between the adjacent light receiving faces 82.

Figure 15:
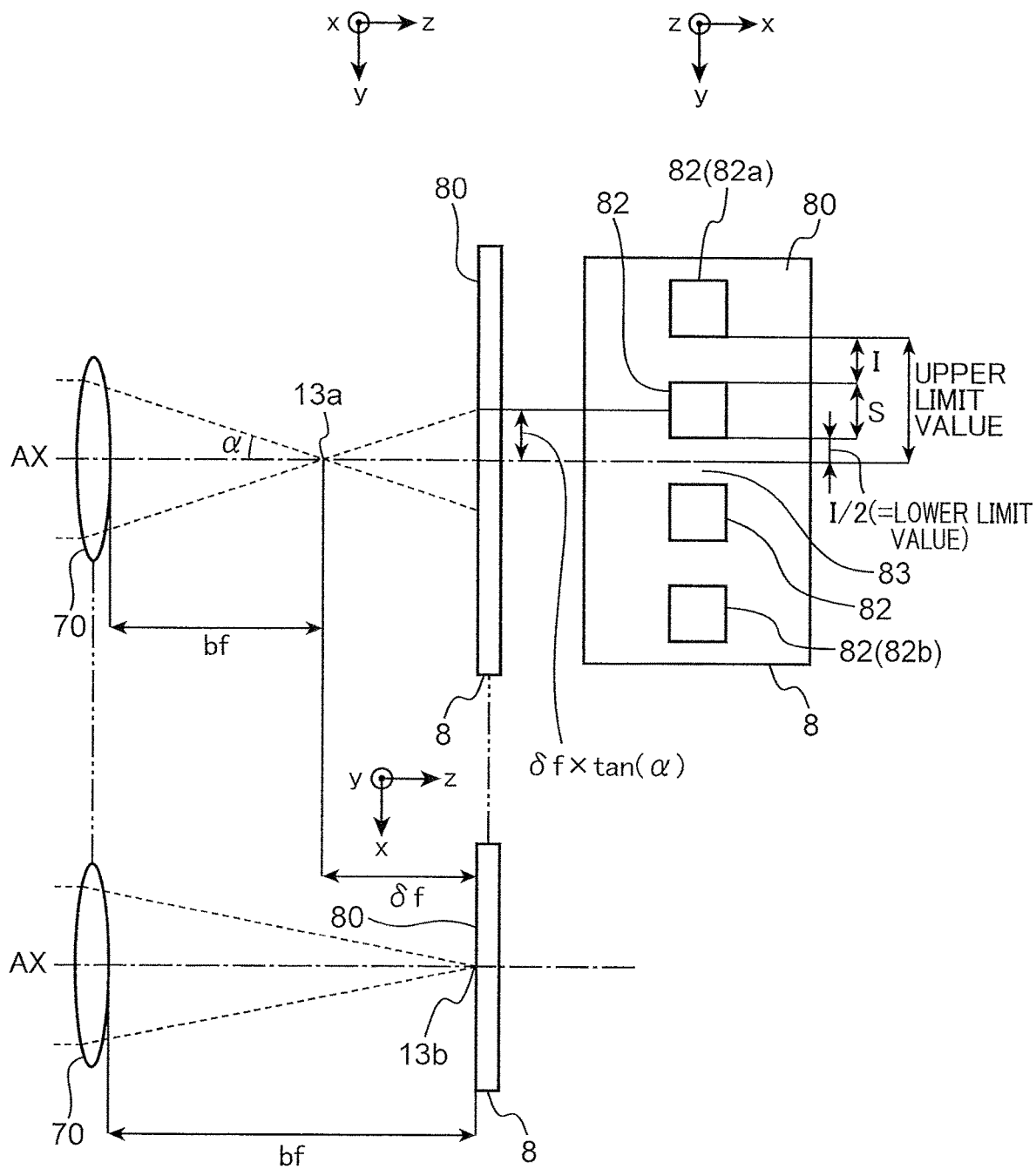
FIG. 15 is an explanatory view explaining a lower limit value and an upper limit value of the size in a y-direction (direction in which the light receiving faces are arrayed) of the light flux.

The range of the size in the y-direction of the light flux 12 of the embodiment and the exemplary modification will now be described. As described above, due to the optical system 7, the light flux 12 of the reflected light 11 that is reflected by the measurement region R has a larger size in the y-direction than in the x-direction. FIG. 15 is an explanatory view explaining a lower limit value and an upper limit value of the size in the y-direction of the light flux 12. The lower limit value and the upper limit value are determined by Formula (1).

[Mathematical Formula 1]

$$I/2 < \delta f \times \tan(\alpha) < 3/2 I + S \qquad (1)$$

I indicates the gap between adjacent light receiving faces 82. δf indicates the difference between the backfocus bf of the light receiving lens 70 in the y-direction (direction in which the light receiving faces 82 are arrayed) and the backfocus bf of the light receiving lens 70 in the x-direction (perpendicular direction). The backfocus is the distance from the rear end to the focus point of the lens system. α is an aperture angle of the light receiving lens 70 in the y-direction. S is the size of the light receiving face 82 in the y-direction.

δf×tan(α) indicates a half value of the size in the y-direction of the light flux 12 on the surface 80 of the light receiver 8. Thus, by setting the half value larger than I/2, the light flux 12 of the reflected light 11 incident on the region 83 between the adjacent light receiving faces 82 can reach at least one of the light receiving faces 82.

If the light flux 12 of the reflected light 11 exists beyond the adjacent light receiving faces 82 to reach the light receiving faces 82a and 82b adjacent to the light receiving faces 82, the reflected light 11 is received by every light receiving face 82, resulting in deterioration in resolution. The half value is therefore set smaller than I×3/2+S. This prevents the light flux 12 of the reflected light 11, incident on the region 83 between the adjacent light receiving faces 82, existing beyond the adjacent light receiving faces 82 to reach the light receiving faces 82a and 82b adjacent to the light receiving faces 82.

More preferably, the half value is set to a value satisfying I/2<δf×tan(α)<I/2+S to prevent the light flux 12 of the reflected light 11, incident on the region 83 between the adjacent light receiving faces 82, from existing beyond the adjacent light receiving faces 82. This suppresses the decrease in the amount of light that the light receiving face 82 receives.

For the exemplary modification, the light receiving lens 70 is construed as an anamorphic lens.

Although the embodiment and the exemplary modification using the laser radar device 1 are described, the present invention can be applied not only to the laser radar device 1 but also to any light projecting and receiving device.

SUMMARY OF EMBODIMENTS

A light projecting and receiving device according to an aspect of the embodiment includes a light source configured to emit light having a thin shape in a cross section viewed in a beam direction of the light, a light receiver including a plurality of avalanche photodiodes each having a light receiving face that receives reflected light that is reflected by a measurement region to which the light source emits light, the light receiving faces being disposed in an array at a predetermined interval along a longitudinal direction of the thin shape, the light receiver having a surface including the light receiving faces and a region between the adjacent light receiving faces, and an optical system configured to guide the reflected light to the light receiver so that a focus point for a direction in which the light receiving faces are arrayed is set before or behind the surface and a focus point for a perpendicular direction is set on the surface, the perpendicular direction being perpendicular to both the direction in which the light receiving faces are arrayed and the beam direction of the reflected light.

The optical system has a function of guiding the reflected light to the light receiver with the focus point for the direction in which the light receiving faces are arrayed set before or behind the surface of the light receiver and the focus point for the perpendicular direction set on the surface of the light receiver.

Using this function, in which the focus point for the direction in which the light receiving faces are arrayed is set before or behind the surface of the light receiver, the size, in the direction in which the light receiving faces are arrayed, of the light flux of the reflected light incident on the surface of the light receiver can be increased. In contrast, since the focus point for the perpendicular direction is set on the surface of the light receiver, the increase in the size in the perpendicular direction of the light flux of the reflected light incident on the surface of the light receiver can be avoided.

In the optical system as described above, the size, in the direction in which the light receiving faces are arrayed, of the light flux of the reflected light incident on the surface of the light receiver is increased, which enables the light flux incident on the region between the adjacent light receiving faces to reach the light receiving face.

If the light flux of the reflected light incident on the surface of the light receiver is large in the perpendicular direction, the light flux exists beyond the light receiving face in the perpendicular direction. If the light receiving face is large, the light flux is received by the light receiving face without existing beyond the light receiving face. A large light receiving face however has a wide light receiving area, which causes greater noise and results in reduction in S/N ratio. Therefore, the increase in the size, in the perpendicular direction, of the light flux of the reflected light on the surface of the light receiver should be avoided.

According to the light projecting and receiving device according to an aspect of the embodiment, in the light receiver including a plurality of avalanche photodiodes with the light receiving faces of the avalanche photodiodes disposed in an array at a predetermined interval, the performance of receiving the reflected light can be improved without reducing the gap between the adjacent light receiving faces.

In this configuration, the optical system includes a light receiving lens configured to set the focus point for the direction in which the light receiving faces are arrayed and the focus point for the perpendicular direction on the surface, and receive the reflected light to guide the reflected light to the light receiver, and an optical element that is disposed before or behind the light receiving lens in the beam direction of the reflected light and has positive or negative power only in the direction in which the light receiving faces are arrayed with respect to the reflected light.

The configuration includes a first aspect and a second aspect of the optical system. The optical element included in the first aspect allows the reflected light to pass through and has positive power only in the direction in which the light receiving faces are arrayed. This shifts the focus point for the direction in which the light receiving faces of the optical system are arrayed from the surface of the light receiver to a point before the surface, with the focus point for the perpendicular direction of the optical system set on the surface of the light receiver.

The optical element included in the second aspect allows the reflected light to pass through and has negative power only in the direction in which the light receiving faces are arrayed. This shifts the focus point for the direction in which the light receiving faces of the optical system are arrayed from the surface of the light receiver to a point behind the surface, with the focus point for the perpendicular direction of the optical system set on the surface of the light receiver.

In this configuration, the optical system includes a light receiving lens configured to set the focus point for the direction in which the light receiving faces are arrayed and the focus point for the perpendicular direction on a point behind the surface, and receive the reflected light to guide the reflected light to the light receiver, and an optical element that is disposed before or behind the light receiving lens in the beam direction of the reflected light and has positive power only in the perpendicular direction with respect to the reflected light.

This configuration is a third aspect of the optical system. This optical element shifts the focus point for the perpendicular direction from a point behind the surface of the light receiver to the surface, with the focus point for the direction in which the light receiving faces of the optical system are arrayed set on a point behind the surface of the light receiver.

In this configuration, the optical system includes a light receiving lens configured to set the focus point for the direction in which the light receiving faces are arrayed and the focus point for the perpendicular direction on a point before the surface and receive the reflected light to guide the reflected light to the light receiver, and an optical element that is disposed before or behind the light receiving lens in the beam direction of the reflected light and has negative power only in the perpendicular direction with regard to the reflected light.

This configuration is a fourth aspect of the optical system. This optical element shifts the focus point for the perpendicular direction from a point before the surface of the light receiver to the surface, with the focus point for the direction in which the light receiving faces of the optical system are arrayed set on a point before the surface of the light receiver.

In the configuration described above, the optical system includes an anamorphic lens configured to set the focus point on a point before or behind the surface and the focus point for the perpendicular direction on the surface to guide the reflected light to the light receiver.

This configuration realizes the function of the optical system described above using a single optical element.

In this configuration, the optical system satisfies Formula (1) expressed below.

[Mathematical Formula 2]

$$I/2 < \delta f \times \tan(\alpha) < 3/2 I + S \qquad (1)$$

(where I is a gap between the adjacent light receiving faces, δf is a difference between a backfocus of the light receiving lens for the direction in which the light receiving faces are arrayed and a backfocus of the light receiving lens for the perpendicular direction, α is an aperture angle of the light receiving lens for the direction in which the light receiving faces are arrayed, and S is a size of the light receiving face for the direction in which the light receiving faces are arrayed.)

As described above, the optical system enlarges the size, in the direction in which the light receiving faces are arrayed, of the light flux of the reflected light on the surface of the light receiver. δf×tan(α) indicates a half value of the size, in the direction in which the light receiving faces are arrayed, of the light flux on the surface of the light receiver. By setting the half value larger than I/2, the light flux of the reflected light incident on a region between the adjacent light receiving faces can reach at least one of the light receiving faces.

If the light flux of the reflected light exists beyond the adjacent light receiving faces to reach light receiving faces adjacent to the light receiving faces, the light flux is received by the four light receiving faces, resulting in deterioration in resolution. The half value is therefore set smaller than I×3/2+S. This prevents the light flux of the reflected light, incident on the region between the adjacent light receiving faces, from existing beyond the adjacent light receiving faces to reach the light receiving faces adjacent to the light receiving faces.

In this configuration, the optical system satisfies Formula (2) expressed below.

[Mathematical Formula 3]

$$I/2 < \delta f \times \tan(\alpha) < 3/2 I + S \qquad (2)$$

(where I is a gap between the adjacent light receiving faces, δf is a difference between a backfocus of the anamorphic lens for the direction in which the light receiving faces are arrayed and a backfocus of the anamorphic lens for the perpendicular direction, α is an aperture angle of the anamorphic lens for the direction in which the light receiving faces are arrayed, and S is a size of the light receiving face for the direction in which the light receiving faces are arrayed.)

This configuration specifies the case for an anamorphic lens. Formula (2), intended in the same manner as Formula (1), construes the light receiving lens as the anamorphic lens.

Another aspect of the embodiment is a laser radar device including the light projecting and receiving device according to an aspect of the embodiment, wherein the light source includes a laser unit configured to emit, as the light, a laser beam having a thin shape in a cross section viewed in a beam direction of the laser beam, and the laser radar device further includes a scanning unit configured to scan in a scanning direction the laser beam emitted by the laser unit to irradiate the measurement region with the scanned laser beam.

The laser radar device according to another aspect of the embodiment scans the laser beam, emitted to the measurement region, along the scanning direction, and thereby the measurement region can be broadened in the scanning direction.

The application is based on Japanese Patent Application No. 2015-146987 filed on 24 Jul. 2015, the entire content of which is incorporated herein in the application.

The present invention is described in a suitable and sufficient manner through the embodiments with reference to the drawings as described above. It should be noted that a person skilled in the art is able to easily alter and/or modify the embodiments. It should be construed that such alterations and modifications made by a person skilled in the art all fall within the scope of the claims unless deviation of such alterations and modifications is beyond the scope of the claims.

INDUSTRIAL APPLICABILITY

The present invention provides a light projecting and receiving device and a laser radar device including the light projecting and receiving device.

The invention claimed is:
1. A light projecting and receiving device comprising:
a light source configured to emit light having a thin shape in a cross section viewed in a beam direction of the light;
a light receiver including a plurality of avalanche photodiodes each having a light receiving face that receives reflected light reflected from a measurement region by irradiating the measurement region with the light emitted from the light source, the light receiving faces being disposed in an array at a predetermined interval along a longitudinal direction of the thin shape, the light receiver having a surface including the light receiving faces and a region between the adjacent light receiving faces; and an optical system configured to guide the reflected light to the light receiver so that a focus point for a direction in which the light receiving faces are arrayed is set before or behind the surface and a focus point for a perpendicular direction is set on the surface, the perpendicular direction being perpendicular to both the direction in which the light receiving faces are arrayed and the beam direction of the reflected light, the optical system comprising:

a light receiving lens configured to set the focus point for the direction in which the light receiving faces are arrayed and the focus point for the perpendicular direction on the surface, and receive the reflected light to guide the reflected light to the light receiver, and an optical element that is disposed before or behind the light receiving lens in the beam direction of the reflected light, allows the reflected light to pass through, and has positive or negative power only in the direction in which the light receiving faces are arrayed, wherein the optical system satisfies Formula (1) expressed below,

[Mathematical Formula 4]

$$I/2 < \delta f \times \tan(\alpha) < 3/2I + S \quad (1)$$

where I is a gap between the adjacent light receiving faces, δf is a difference between a backfocus of the light receiving lens for the direction in which the light receiving faces are arrayed and a backfocus of the light receiving lens for the perpendicular direction, α is an aperture angle of the light receiving lens for the direction in which the light receiving faces are arrayed, and S is a size of the light receiving face for the direction in which the light receiving faces are arrayed.

2. A light projecting and receiving device comprising:

a light source configured to emit light having a thin shape in a cross section viewed in a beam direction of the light;

a light receiver including a plurality of avalanche photodiodes each having a light receiving face that receives reflected light reflected from a measurement region by irradiating the measurement region with the light emitted from the light source, the light receiving faces being disposed in an array at a predetermined interval along a longitudinal direction of the thin shape, the light receiver having a surface including the light receiving faces and a region between the adjacent light receiving faces; and an optical system configured to guide the reflected light to the light receiver so that a focus point for a direction in which the light receiving faces are arrayed is set before or behind the surface and a focus point for a perpendicular direction is set on the surface, the perpendicular direction being perpendicular to both the direction in which the light receiving faces are arrayed and the beam direction of the reflected light, wherein the optical system includes an anamorphic lens configured to set the focus point for the direction in which the light receiving faces are arrayed on a point before or behind the surface and the focus point for the perpendicular direction on the surface to guide the reflected light to the light receiver, and wherein the optical system satisfies Formula (2) expressed below,

[Mathematical Formula 5]

$$I/2 < \delta f \times \tan(\alpha) < 3/2I + S \quad (1)$$

where I is a gap between the adjacent light receiving faces, δf is a difference between a backfocus of the anamorphic lens for the direction in which the light receiving faces are arrayed and a backfocus of the anamorphic lens for the perpendicular direction, α is an aperture angle of the anamorphic lens for the direction in which the light receiving faces are arrayed, and S is a size of the light receiving face for the direction in which the light receiving faces are arrayed.

* * * * *